Sept. 13, 1960   G. S. KNOX   2,952,437
SEALING GATE VALVE

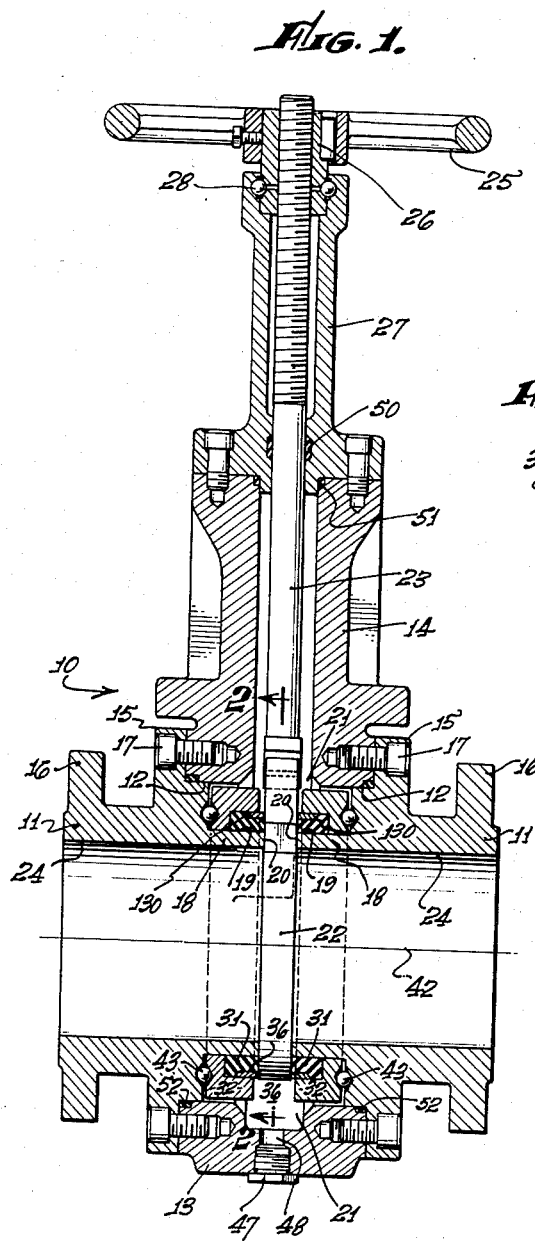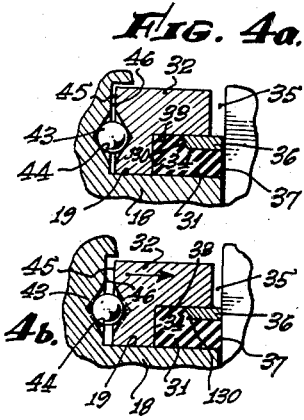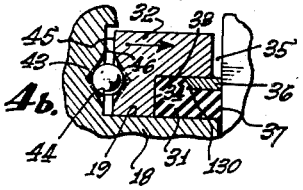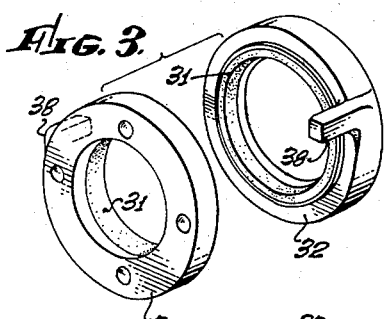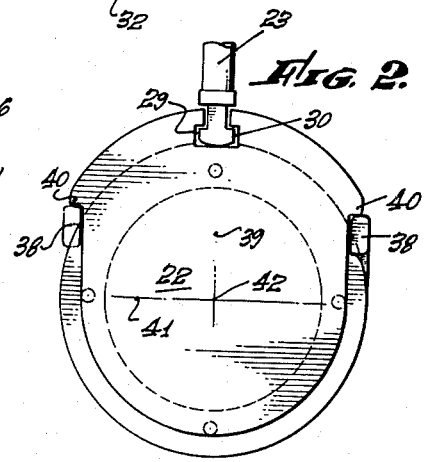

Filed Oct. 15, 1956   3 Sheets-Sheet 2

GRANVILLE S. KNOX,
INVENTOR.

By [signature]
ATTORNEY.

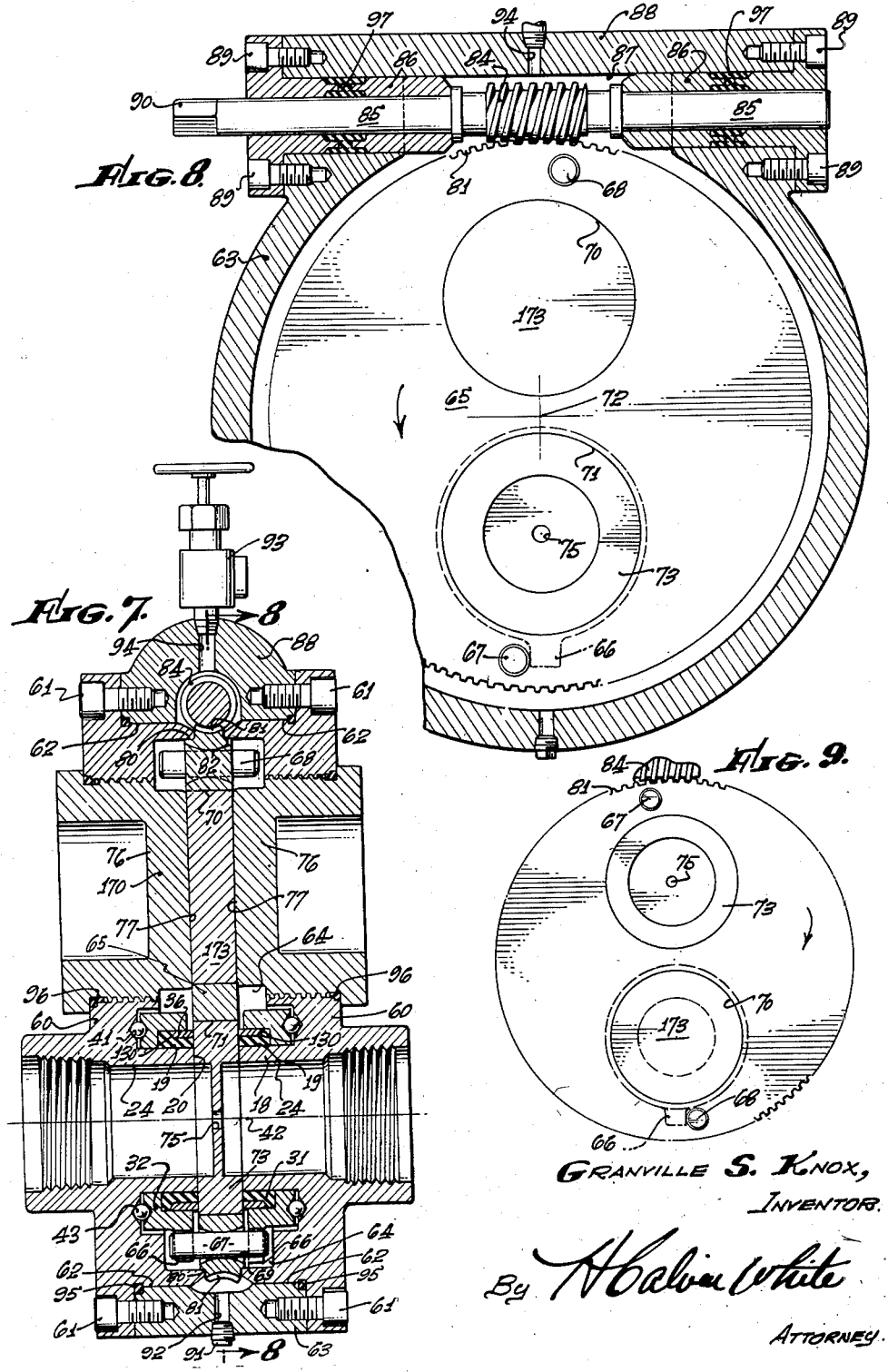

United States Patent Office 2,952,437
Patented Sept. 13, 1960

2,952,437

SEALING GATE VALVE

Granville S. Knox, Glendale, Calif., assignor to Hydril Company, Los Angeles, Calif., a corporation of Ohio Filed Oct. 15, 1956, Ser. No. 615,944

15 Claims. (Cl. 251—171)

This invention relates generally to fluid controlling devices, and more particularly has to do with improvements in such devices incorporating gate valving operation and especially to the gate sealing action thereof taking place as the device is closed, various novel features of the invention residing in the construction of improved gate valving devices in general, gate type orifice fittings in particular and also in the arrangement and coaction of the parts automatically accomplishing positive sealing as the valving gate is moved to final flow blanking position in the valve chamber. As subsequently used herein, the term "valve" refers broadly to any device for controlling fluid flow, and the term "gate valve" shall refer to such a flow controlling device incorporating a gate as the flow controlling element, as for example a solid plate, orifice plate or gate insert and the like or combinations thereof.

From the standpoint of simple and reliable operation of a gate valve incorporating packing material for sealing off between the movable valve gate and fixed valve body, it is found that for maximum effective and uniform sealing pressure distribution the packing should be bodily displaceable into engagement with the gate and portions of the valve body, the packing preferably being formed of a relatively rigid internally tenacious material such as molded tetrafluoroethylene or asbestos and being closely confined by metal parts when great pressure is exerted thereon to minimize any tendency of the material to extrude out between metal parts. Furthermore, bodily displacement of the packing into pressure sealing condition should take place only after or just before the gate has come to rest in flow blanking position in the chamber so that the packing will not be pressure squeezed into the path of gate movement to be worn away thereby.

Finally the sealing action referred to should be automatically initiated as the manual control for the gate is moved to closed position, and with as little complication as possible as respects the number of parts and their interactions to establish the seal. While some valves are designed with different components separately operable by a handwheel to first move the gate to flow blanking position and thereafter displace the packing to establish the seal, the present novel valve makes advantageous use of movement of the gate itself actuating packing displacement just before the gate arrives at final flow blanking position. Such activation of the sealing function is accomplished by providing means extending in the path of gate travel and movable in response to gate engagement therewith to bodily displace the packing into sealing engagement with the gate, the packing displacing means consisting of such loosely interfitting parts operating together with relatively frictionless action that they may be fully exposed to the fluid in the valve chamber without concern, thereby eliminating the need for a special seal between the gate and these packing displacing elements. Further, the packing itself is substantially confined by the gate, valve body and movable packing displacing means when the pressure sealing action is established minimizing every tendency of the packing to extrude out of position under great pressure.

The preferred arrangement of parts consists of a pair of packing annuli suported by the valve body to receive the gate therebetween, at least one and preferably both of the annuli being axially bodily displaceable toward the gate when moved into position therebetween by a thrust ring, or rings, portions of which extend in the path of gate displacement, and which are movable laterally in response to gate engagement therewith. The gate is supported by close fitting body faces for maximum protection in case of fire and so that the faces are wiped clean of sediment by the gate during its movement. Also, as the valve is opened or closed, the body faces support the gate in such relation to the retracted packing that any thrust loads exerted against the gate resulting from differential fluid pressure acting thereon cannot force the gate into harmful contact with the packing. In addition, the valve design is such that the packing and actuating thrust rings engageable therewith do not have to work against fluid pressure in the valve chamber as the packing is shifted bodily into gate sealing position.

A further object of the invention is to provide a gate type valve assembly in which the valve gate, or flow controlling element, is made in the form of an easily removable and replaceable disk or plate. The novel structure also provides an unusually simple, safe and effective means for the rapid removal and replacement of the valve disk while the valve assembly remains in the flow line and is subjected to the full flow line pressure.

A valve of this type can be used most advantageously for restricting and regulating the flow from oil and gas wells because the production from such wells normally contains quantities of sand and other abrasive elements which tend to rapidly erode and cut out the restrictive opening in the orifice plate so that frequent replacement of this part may be necessary.

One of the preferred forms of the invention contemplates the use of two orfice plates which, if desired, may have the same size openings. This permits a new orifice plate to be moved into a position across the flow stream as a worn plate is moved out of the flow stream and into a position where it can be easily removed and replaced without further interruption of the flow of oil or gas from the well, the flow continuing through the new orifice plate while the worn plate is replaced.

These and other objects of the invention, as well as the details of an illustrative embodiment, will be more fully understood from the following detailed description of the drawings, in which:

Fig. 1 is a vertical section taken through a valve with the gate being moved into flow blanking position;

Fig. 2 is a section taken on line 2—2 of Fig. 1 showing the gate as it engages the thrust rings operable to bodily displace the packing annuli;

Fig. 3 is a perspective view of the two thrust rings;

Figs. 4a and 4b are enlarged fragmentary sections showing the disposition of the gate, packing and thrust rings respectively just before and after bodily displacement of the packing into engagement with the gate;

Fig. 7 is a vertical section taken through an orifice fitting showing the gate in flow controlling position;

Fig. 8 is a vertical section taken on line 8—8 of Fig. 7; and

Fig. 9 is a reduced frontal elevation of the Figs. 7 and 8 in flow blanking position.

Figure 5:
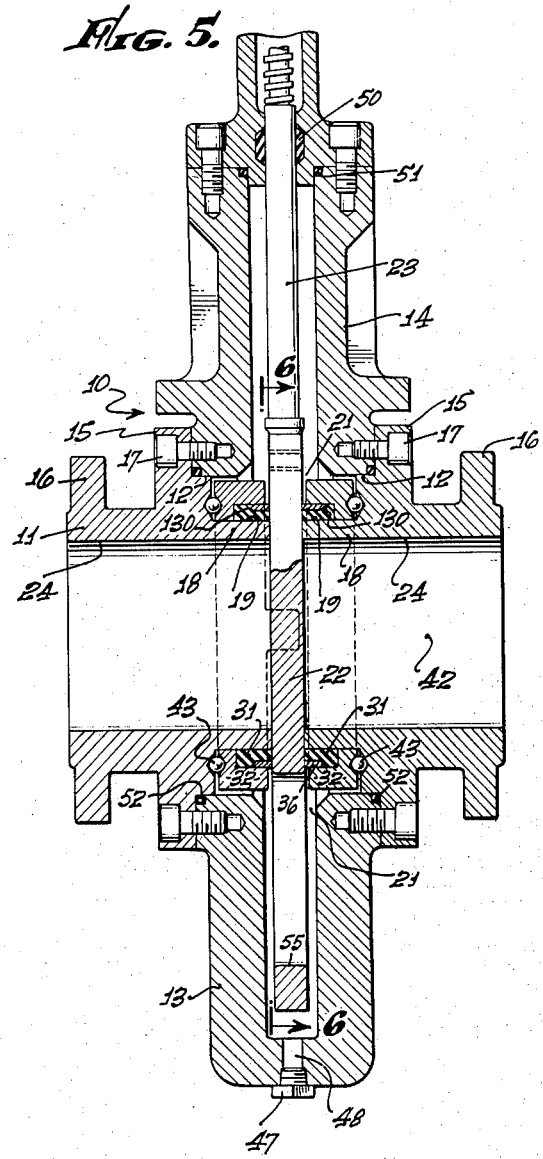
Fig. 5 is a vertical section through a modified valve showing the gate moved into flow blanking position.

The valve assembly generally indicated at 10 includes a pair of similar flanged body caps 11 symmetrically connected into opposite ends of a lateral bore 12 formed by a body annulus 13 integral with extension 14, each cap 11 including a pair of laterally spaced vertical flanges 15 and 16, the former being connected by fasteners 17 with annulus 13 and the latter being connectible to piping not shown. Caps 11 include similar reduced dimension cylindrical bosses 18 having outer surfaces 19 spaced from the annulus 13 and spaced opposite end faces 20, these spaces together forming a valve chamber generally indicated at 21 and within which valve gate 22 is longitudinally movable relatively up and down by rod 23 for controlling the flow of fluid through the chamber and the coaxial inlet and outlet valve passage 24 formed by the two body caps 11 at opposite chamber sides. Vertical rod displacement is effected by rotating handwheel 25 keyed to nut 26, which is in turn threaded to the upper end of the rod, the nut being mounted for friction free rotation in the bonnet 27 by ball bearing 28, yet retained thereby against axial displacement.

The gate itself is in the form of a relatively narrow plate extending in a plane normal to the direction of flow through passages 24, and contains an inverted T-shaped recess 29 extending laterally through the upper portion of the gate for loosely retaining an inverted square T-head 30 carried at the lower end of rod 23. As a result the gate, which cannot rotate in the chamber 21 about a vertical axis, prevents rod rotation upon turning of the nut 26 since the straight walls of recess 29 interfere with rotation of the T-head 30. At the same time, the loose mounting of the gate on the rod permits slight lateral shifting of the gate sufficient for adjusting itself in pressure equalizing sealing engagement with the two packing annuli 31 at opposite sides of the gate.

The packings preferably comprise relatively rigid internally tenacious plastic material such as molded tetrafluoroethylene or asbestos capable of bodily displacement primarily in a single direction under high pressure, as distinguished from plastic flow in different directions as is characteristic of natural or synthetic rubber under the same pressure conditions.

Each packing annulus 31 is mounted on the outer cylindrical surface 19 of one of the bosses 18 for lateral sliding bodily displacement toward and away from a side of the gate, such displacement being effected by thrust rings 32 riding on surfaces 19 and containing lateral bores 33 receiving the packings against the bore inner ends 34. The packing annuli project laterally from the bores sufficiently clear of the thrust rings 32 and toward the gate sides for compressive engagement therewith during valve sealing in closed condition without danger of metal-to-metal engagement of the rings with the gate. To prevent pressure from extruding the packings into the clearances 35 between the rings and gate under extreme pressure conditions, metal insert rings 36 are concentrically fitted on the packing annuli to ride against the bores 33 in spaced relation from bore ends 34 and project to the sealing ends 37 of the packings 31 so as to cover and separate the latter from the clearances 35.

The end 130 of each insert ring 36, where it contacts packing 31, is beveled to facilitate some extrusion, or squeezing, of the plastic packing through ring 36 brought about by pressural engagement with the end 34 of the thrust ring 32. Such extrusion is desirable as a means of compensating for any wear or loss of material at sealing ends 37.

The thrust rings 32 carry a pair of integral lugs 38 projecting laterally across chamber 21 on opposite sides of vertical gate axis 39 for engagement by opposite gate ears 40 on downward stopper displacement. The lugs are carried above a horizontal plane 41 through axis 42 of passages 24 so that they will tend to move away from vertical axis 39 and from the gate edges as they are simultaneously forced downwardly by the gate ears, producing relatively opposite thrust ring rotation about axis 42. The loose fit between the T-head 30 and recess 29 accommodates limited rocking movement of the gate sufficient, should one lug 38 be engaged before the other, for engagement of both lugs prior to effective ring rotation.

Anti-friction bearings 43 are equally spaced about axis 42 within opposite conical recesses 44 in opposite faces 45 and 46 of the thrust rings and caps 11, these bearings extending generally in the path of ring rotation so as to urge the rings oppositely toward the packings and gate in response to rotary movement thereof. In so doing, the balls roll up on opposite conical recess walls inclined in the direction of ring rotation and laterally toward the gate as seen in Figs. 4a and 4b. Thus, lateral thrust is transmitted to the packing annuli, bodily displacing them into sealing engagement with opposite sides of the gate in flow blanking position and with boss surfaces 19, effectively sealing the valve.

In this condition, the packings and stopper prevent entrance of fluid into valve chamber 21 from either one of passages 24. The tightness of this fluid seal can be tested by removing plug 47 from the lower outlet opening 48 in annulus 13 so that leakage of fluid into chamber 21 may be detected. When the handwheel is rotated counterclockwise, initial retraction of the gate releases the thrust rings and relieves the sealing pressure on the packing annuli so that the gate may be withdrawn upwardly without interference by the packings. The rings 32 may then rotate relatively backwardly so that the balls become centered in the conical recesses and the packings fully retracted as seen in Fig. 4a. In this condition, fluid from passages 24 may enter all of chamber 21 coming in contact with the balls and thrust rings, but with little likelihood of damage to the parts since the clearances between the moving parts are large, permitting free sediment drainage to the bottom of chamber 21 to be periodically drawn off through opening 48.

Seals 50 and 51 respectively between the bonnet 27 and rod 23 and the bonnet and extension 14 prevent escape of fluid from chamber 21 past these elements. Also annular seals 52 between the annulus and body caps 11 prevent fluid escape therebetween from within chamber 21.

Figure 6B:
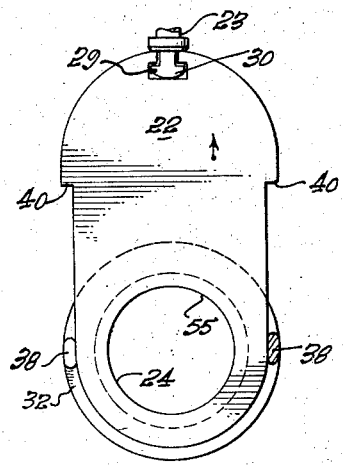
Fig. 6b is a reduced frontal elevation of the Fig. 5 gate shown in flow passing position.
Figure 6A:
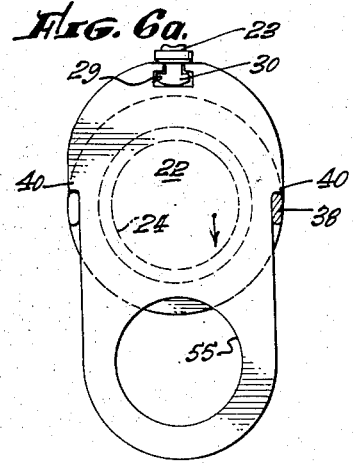
Fig. 6a is a reduced frontal elevation taken on line 6—6 of Fig. 5 showing the gate in flow blanking position.

In Figs. 5 and 6, showing elements corresponding to those previously described in connection with Fig. 1 retaining the same numerals, the gate 22 is elongated in the vertical direction and the body annulus 13 is also extended downwardly to receive a portion of the gate in a lower portion of chamber 21 extended well below lateral passages 24. An orifice 55 is centered in the lower section of the gate so as to be completely out of communication with passages 24 when the solid gate portion above the orifice is in flow blanking position with the packing annuli in pressural engagement against the gate.

On longitudinal upward retraction of the gate, the orifice 55 is first brought into partial registration with passages 24 and ultimately arrives at centered position with respect to the passages 24, for passing full flow through the valve, the orifice 55 having the same diameter as passages 24. Since opposite faces of the gate remain throughout gate travel in closely spaced adjacent relation with the ends 20 of the annular bosses 18, particles of matter carried by the flow pass through the open valve without becoming trapped in the portion of chamber 21 below passages 24. Furthermore, when orifice 55 is in registration with passages 24, the valve presents smoothly streamlined surfaces to the flow therethrough, reducing fluid friction losses to a minimum.

The orifice fitting illustrated in Figs. 7 through 9 includes a pair of body caps 60 symmetrically connected by fasteners 61 into opposite ends of a lateral bore 62 formed by a relatively large body annulus 63. Caps 60 include similar reduced dimension cylindrical bosses 18 having outer surfaces 19 and end faces 20 as described in connection with Fig. 1, the caps and annulus together forming an upright valve chamber generally indicated at 64 and within which a gate 65 is rotatable in a plane normal to the axis 42 of passages 24.

Mounted on the cylindrical surfaces 19 at opposite sides of the gate are two packing annuli 31 preferably comprising relatively rigid internally tenacious plastic material such as molded tetrafluoroethylene or asbestos, the annuli being capable of lateral sliding bodily displacement toward and away from the gate sides. Such displacement toward the gate is effected by thrust rings 32 mounted in relation to the packing annuli and bosses 18 as described in connection with Fig. 1. The rings carry integral lugs 66 projecting downwardly into a portion of chamber 64 directly below the rings for engagement by spaced pins 67 and 68 carried by the rotatable gate. The pins project through openings 69 formed in the gate with axial convexity such that the pins may rock to a limited extent out of axially parallel relation with passages 24 upon engagement with lugs 66, thereby equalizing loading transmitted to the thrust rings tending to rotate them generally in the direction of gate rotation. Such ring rotation is effective to bodily laterally displace the packing annuli into pressurized sealing engagement with opposite sides of the gate, through the interaction of the ball bearings 43 with the rings and caps 60 as explained above.

The gate typically though not necessarily contains two circular openings 70 and 71 spaced diametrically oppositely of the gate axis of rotation 72. An orifice type gate insert 73 may be fitted in opening 71 and a solid insert 173 in opening 70 loosely engaging the walls thereof. The openings are respectively located in such relation with diametrically opposite pins 67 and 68 that upon gate rotation bringing a pin into engagement with the ring lugs 66 one or the other of the openings 70 and 71 will be in centered registration with passages 24 at the time that further gate rotation is effectively blocked by pressural engagement of the packing annuli with the sides of the gate or orifice insert. Thus, when the gate is rotated counterclockwise, pin 67 engages the ring lugs and the orifice insert containing a flow metering orifice 75 is brought into and held in centered relation with passage axis 42, the packing annuli at the same time sealing off between the gate insert and bosses 18. And, when the gate is rotated clockwise, pin 68 engages the ring lugs, and opening 70 together with solid gate insert 173 is brought into centered relation with passages 24 for blanking the flow.

Under the latter condition, the orifice type gate insert 73 is positioned between a pair of removable plugs 76 threaded opposite one another into the caps 60 and projecting into chamber 64, so that the inner faces 77 of the plugs are in loose guiding engagement with the gate and gate inserts during gate rotation. The plugs are diametrically larger than the inserts to accommodate ready replacement of the inserts from either side of the fitting after removal of one of the plugs. Inasmuch as the packing annuli are at such times in pressure sealing engagement with one or the other of the gate inserts and bosses 18, fluid flow through the valve passages 24 is effectively isolated from chamber 64, facilitating changing of the insert positioned between the plugs.

The gate is mounted for rotation in chamber 64 by sliding engagement of annular peripheral gate shoulders 80, at opposite sides of circumferentially spaced gate teeth 81, with annular shoulders 82 formed by caps 60, facilitating lateral removal of the gate when one of the caps is disassembled from the annulus 63. Gate teeth 81 are in turn in mesh with a worm 84 formed on a shaft 85 carried by a pair of coaxial bushings 86 at axially opposite sides of the worm. The bushings are received within bore 87 formed in the annulus head 88, with fasteners 89 removably connecting the bushings to the head.

A projecting end of the shaft 85 is provided with flats 90 engageable by a wrench for turning the shaft to effect gate rotation between its limiting angular positions as described above. To change a gate insert it is only necessary to manually turn shaft 85 in one direction as far as possible so as to rotate the gate bringing an opening 70 or 71 between the removable plugs 76. For example, the orifice insert 73 may be replaced with an insert having the same or a different size orifice after removing one of the plugs. Thus, the only auxiliary steps necessary in changing an insert are turning of shaft 85 and removing and replacing one plug 76.

It should be noted that two orifice type gate inserts, having the same or different sized openings, can be installed in gate openings 70 and 71 instead of the orifice insert and solid insert combination described above. In any event the operation of removing and installing new inserts is the same as previously described.

Drainage of sediment trapped in the lower end of chamber 64 is facilitated by removing plug 91 from threaded port 92 in the bottom of the annulus 63. Before removing plugs 76 or plug 91 pressure within chamber 64 should be released through valve fitting 93 threaded into an opening 94 in the top of the annulus.

Seals 95 between the annulus 63 and caps 60, 96 between the caps and plugs 76, and 97 between the bushings 86, shaft 85 and head 88 respectively prevent the escape of fluid from chamber 64.

I claim:

1. An improved valve, comprising body means forming an enclosed valve chamber and having flow passages opening into the chamber for flowing fluid therethrough, a stopper member movable in the chamber into and out of position in which the stopper blanks flow through the chamber, said body means forming a cylindrical boss extending around at least one of said passages and projecting into said chamber and into close fitting engagement with the stopper in said flow blanking position thereof, and a packing assembly mounted upon said boss in said chamber and including an annulus of internally tenacious packing material for sealing off the fit between said boss and stopper when the stopper is in said flow blanking position, said assembly including thrust means for transmitting pressure toward said packing annulus to thrust said annulus toward and into sealing contact with the stopper member, said thrust means including a thrust member encircling said boss and having an annularly continuous portion spaced radially outwardly from the boss so that said portion and the boss form an annular channel receiving said packing annulus, said assembly including an insert ring in said channel cooperative with said thrust member, boss and stopper to confine the packing annulus against pressural extrusion from said channel when the annulus is thrust into sealing contact with the stopper.

2. An improved valve, comprising body means forming an enclosed valve chamber and having flow passages opening into the chamber for flowing fluid therethrough, a stopper member movable in the chamber into and out of position in which the stopper blanks flow through the chamber, said body means forming a cylindrical boss extending around at least one of said passages and projecting into said chamber and into close fitting engagement with the stopper in said flow blanking position thereof, and a packing assembly mounted upon said boss in said chamber and including an annulus of internally tenacious packing material for sealing off the fit between said boss and stopper when the stopper is in said flow blanking position, said assembly including thrust means for transmitting pressure toward said packing annulus to thrust said annulus toward and into sealing contact with the stopper member, said thrust means including a thrust member encircling said boss and having an annularly continuous portion spaced radially outwardly from the boss so that said portion and the boss form an annular channel receiving said packing annulus, said assembly including an insert ring in said channel cooperative with said thrust member, boss and stopper to confine the packing annulus against pressural extrusion from said channel when the annulus is thrust into sealing contact with the stopper, and means operable to move the stopper into flow blanking position and thereafter to simultaneously rotate said thrust member about said boss and bodily move said thrust member along the boss whereby said thrust member thrusts the packing annulus into sealing contact with the stopper member.

3. The invention as defined in claim 2 in which said last named means includes cam means and in which said thrust member comprises a ring, said thrust ring and cam means having interengaged relatively movable surfaces angled with respect to the direction of thrust ring rotation for axially bodily displacing the thrust ring along said boss during thrust ring rotation.

4. The invention as defined in claim 3 in which said thrust ring is mounted on said boss for bodily displacement with said packing annulus and in thrust transferring relation therewith.

5. The invention as defined in claim 4 in which said insert ring extends about the periphery of said packing annulus, and in which said insert ring and packing annulus project from said channel toward the flow blanking position of the stopper.

6. The invention as defined in claim 5 in which said thrust ring extends radially inwardly over one end of said packing annulus furthest from the stopper member, and said packing annulus extends radially outwardly over one end of said insert ring furthest from the stopper member.

7. An improved gate valve, comprising body means forming an enclosed valve chamber and having laterally oppositely spaced inlet and outlet passages opening into the chamber for flowing fluid therethrough, a gate assembly including a gate movable in the chamber in a longitudinal plane into and out of position in which the gate blanks flow through the chamber, said body means forming a cylindrical boss extending around at least one of said passages and projecting laterally into said chamber and into close fitting engagement with the gate in said flow blanking position thereof, and a packing assembly mounted upon said boss in said chamber and including an annulus of internally tenacious packing material for sealing off the fit between said boss and gate when the gate is in said flow blanking position, said packing assembly including thrust means for transmitting pressure toward said packing annulus to thrust said annulus toward and into sealing contact with said gate, said thrust means including a thrust ring encircling said boss and having an annularly continuous portion spaced radially outwardly from the boss so that said portion and the boss form an annular channel receiving said packing annulus, said packing assembly including an insert ring in said channel cooperative with said thrust ring, boss and gate to confine the packing annulus against pressural extrusion from said channel when the annulus is thrust into sealing contact with the gate and means operable to move the gate into flow blanking position and thereafter to simultaneously rotate said thrust ring about said boss and bodily move said thrust ring along the boss whereby said thrust ring thrusts the packing annulus into sealing contact with the gate.

8. The invention as defined in claim 7 in which said last named means include shoulders on said thrust ring and gate assembly interengageable to transmit tangential thrust from the gate assembly to the thust ring acting about the thrust ring axis to rotate the thrust ring.

9. The invention as defined in claim 8 comprising lugs on the gate assembly and thrust ring.

10. The invention as defined in claim 7 in which said gate contains an orifice movable into flow controlling position between said inlet and outlet passages.

11. The invention as defined in claim 10 comprising an orifice plate removably supported by the gate.

12. The invention as defined in claim 11 in which a section of said chamber forming body means is removable to give sufficient access to said chamber and plate from the valve exterior for removal of the plate when the gate is in flow blanking closed position.

13. The invention as defined in claim 10 comprising an orifice near one end of the gate, and including means for moving said gate longitudinally in said chamber.

14. The invention as defined in claim 12 comprising a circular gate extending in a plane normal to the flow direction through the valve and containing an opening between the gate center and periphery receiving said orifice plate, and including means for rotating said gate in said chamber.

15. An improved gate valve, comprising body means forming an enclosed valve chamber and having laterally oppositely spaced inlet and outlet passages opening into the chamber for flowing fluid therethrough, a gate assembly including a gate movable in the chamber in a longitudinal plane into and out of position in which the gate blanks flow through the chamber, said body means forming laterally spaced cylindrical bosses extending around said passages and projecting laterally and oppositely toward one another in the chamber and into close fitting engagement of at least one boss with the gate in said flow blanking position thereof, and packing assemblies mounted on said bosses in said chamber each packing assembly including an annulus of internally tenacious packing material for sealing off the fit between said boss and gate when the gate is in said flow blanking position, each packing assembly including thrust means for transmitting pressure toward said packing annulus to thrust said annulus toward and into sealing contact with said gate, said thrust means including a thrust ring encircling said boss and having an annularly continuous portion spaced radially outwardly from the boss so that said portion and the boss form an annular channel receiving said packing annulus, each packing assembly including an insert ring in said channel cooperative with said thrust ring, boss and gate to confine the packing annulus against pressural extrusion from said channel when the annulus is thrust into sealing contact with the gate, and means operable to move the gate into flow blanking position and thereafter to simultaneously rotate said thrust rings about said bosses and bodily move said thrust rings along the bosses whereby the thrust rings thrust the packing annuli into sealing contact with the gate.

References Cited in the file of this patent

UNITED STATES PATENTS

| | | |
|---|---|---|
| 1,062,064 | Ward | May 20, 1913 |
| 1,168,490 | Duncan | Jan. 18, 1916 |
| 1,931,797 | Howard | Oct. 24, 1933 |
| 2,035,548 | Johnson | Mar. 31, 1936 |
| 2,219,504 | Willis | Oct. 29, 1940 |
| 2,298,036 | Cohen | Oct. 6, 1942 |
| 2,316,933 | Chaplin | Apr. 20, 1943 |
| 2,734,714 | Knox | Feb. 14, 1956 |

FOREIGN PATENTS

| | | |
|---|---|---|
| 629,628 | Germany | May 11, 1936 |